US007685215B1

(12) United States Patent
Gaide et al.

(10) Patent No.: US 7,685,215 B1
(45) Date of Patent: Mar. 23, 2010

(54) FAST-CARRY ARITHMETIC CIRCUIT USING A MULTI-INPUT LOOK-UP TABLE

(75) Inventors: Brian Gaide, Austin, TX (US); Xiaojie He, Austin, TX (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 1185 days.

(21) Appl. No.: 11/257,137

(22) Filed: Oct. 24, 2005

(51) Int. Cl.
*G06F 7/38* (2006.01)
*G06F 7/50* (2006.01)
(52) U.S. Cl. .................. 708/235; 708/670; 708/700
(58) Field of Classification Search .............. 708/235, 708/700
See application file for complete search history.

(56) References Cited

U.S. PATENT DOCUMENTS 6,476,634 B1 * 11/2002 Bilski ........................ 326/40
7,185,035 B1 * 2/2007 Lewis et al. ................. 708/235
7,358,765 B2 * 4/2008 Verma et al. ................ 326/41
2007/0244958 A1 * 10/2007 Redgrave .................... 708/700

* cited by examiner

*Primary Examiner*—Lewis A Bullock, Jr.
*Assistant Examiner*—Hang Pan
(74) *Attorney, Agent, or Firm*—Mendelsohn, Drucker, & Associates, P.C.

(57) ABSTRACT

In one embodiment of the invention, programmable circuits, such as FPGAs, may be used to implement different types of functions, such as a multi-bit adder, using look-up table (LUT) circuits as their building blocks. Efficient generation of carry-out signals and fast-carry generation signals using available SRAM cells in the various embodiments of the LUT circuit can reduce and/or eliminate area-inefficient look-ahead carry logic without a significant delay in signal generation.

4 Claims, 9 Drawing Sheets

FAST-CARRY ARITHMETIC CIRCUIT USING A MULTI-INPUT LOOK-UP TABLE

TECHNICAL FIELD

The present invention relates to programmable devices, such as field-programmable gate arrays (FPGAs), and, in particular, to fast-carry arithmetic circuits for such devices.

BACKGROUND

A multi-bit adder is a circuit that receives two multi-bit binary input values and generates a multi-bit binary sum value corresponding to the sum of the two input values. Two conventional types of multi-bit adders are ripple-carry adders and look-ahead carry adders.

FIG. 1 shows a block diagram of conventional 4-bit ripple-carry adder 100, which receives two 4-bit binary input values (A3 A2 A1 A0) and (B3 B2 B1 B0) and generates a corresponding 5-bit binary sum value (C4 SUM3 SUM2 SUM1 SUM0), where A3, B3, and C4 are the most-Significant bits (MSBs) and A0, B0, and SUM0 are the least-significant bits (LSBs) of the three binary values, respectively.

Ripple-carry adder 100 comprises four 1-bit adders 101-104 connected serially from LSB adder 101 to MSB adder 104. Each 1-bit adder receives three 1-bit input values Ai, Bi, and Ci and generates 1-bit sum bit SUMi and 1-bit carry bit Ci+1, according to Equations (1) and (2) as follows:

$$SUMi = Ai \text{ XOR } Bi \text{ XOR } Ci \quad (1)$$

$$Ci+1 = Ai \cdot Bi + (Ai \text{ XOR } Bi)Ci \quad (2)$$

where the "XOR" operator is the logical "exclusive OR" function, the "·" operator is the logical "AND" function, and the "+" operator is the logical "OR" function. Note that Ci is the $i^{th}$ carry bit, which is received from the previous 1-bit adder, while Ci+1 is the $(i+1)^{th}$ carry bit, which is applied to the subsequent 1-bit adder.

If adder 100 is operated, in a stand-alone manner, as a 4-bit adder, then carry bit C0 is 0, and carry bit C4 is the MSB of the resulting multi-bit sum. Alternatively, one or more instances of 4-bit adder 100 can be connected in series to form a multi-bit adder, in which case, carry bit C0 corresponds to carry bit C4 from the previous instance of 4-bit adder 100 (if there is one), and carry bit C4 is applied as carry bit C0 to the subsequent instance of 4-bit adder 100 (if there is one).

Adder 100 is referred to as a "ripple-carry" adder, because the carry bits ripple through adder 100 in a serial manner. In particular, the carry-in bit (CIN in FIG. 1) received at each 1-bit adder is not valid until after the previous 1-bit adder has generated its carry-out bit (COUT). As such, adder 102 must wait until adder 101 has completed its implementation of Equation (2) before it can complete its implementation of Equations (1) and (2). Similarly, adder 103 must wait until adder 102 has completed its implementation of Equation (2) before it can complete its implementation of Equations (1) and (2). Lastly, adder 104 must wait until adder 103 has completed its implementation of Equation (2) before it can complete its implementation of Equations (1) and (2). This results in an inherent limitation to the speed at which a ripple-carry adder can generate its multi-bit output sum value, which speed decreases as the number of bits increases.

To overcome the processing-speed limitations associated with ripple-carry adders, look-ahead carry adders may be used.

FIG. 2 shows a block diagram of conventional 4-bit look-ahead carry adder 200, which, like 4-bit ripple-carry adder 100 of FIG. 1, receives two 4-bit binary input values (A3 A2 A1 A0) and (B3 B2 B1 B0) and generates a corresponding 5-bit binary sum value (C4 SUM3 SUM2 SUM1 SUM0).

Like ripple-carry adder 100, look-ahead carry adder 200 comprises four 1-bit adders 201-204 connected serially from LSB adder 201 to MSB adder 204, where each 1-bit adder receives three 1-bit input values Ai, Bi, and Ci and two 1-bit values SUMi and Ci+1 are generated according to Equations (1) and (2). Unlike, ripple-carry adder 100, however, look-ahead carry adder 200 includes look-ahead carry generation logic 205, which generates carry bits C1-C4 in parallel with the processing of 1-bit adders 201-204.

Look-ahead carry adder 200 takes advantage of the fact that carry bit Ci+1 generated by the $i^{th}$ 1-bit adder has a value of 1 only (i) if both bits Ai and Bi are a 1 or (ii) if only one of bits Ai and Bi is a 1 and carry bit Ci from the previous 1-bit adder is also a 1. Thus, carry bit Ci+1 may be re-defined from Equation (2) according to Equation (3) as follows:

$$Ci+1 = Gi + Pi \cdot Ci \quad (3)$$

where generate bit Gi and propagate bit Pi are defined according to Equations (4) and (5) as follows:

$$Gi = Ai \cdot Bi \quad (4)$$

$$Pi = (Ai \text{ XOR } Bi) \quad (5)$$

Substituting Equation (5) into Equation (1) yields an alternative formula for generating sum bit SUMi, according to Equation (6) as follows:

$$SUMi = Pi \text{ XOR } Ci \quad (6)$$

Substituting Equations (4) and (5) into Equation (2) to generate a formula for carry bit C1 yields Equation (7) as follows:

$$C1 = G0 + P0 \cdot C0 \quad (7)$$

Substituting Equations (4), (5), and (7) into Equation (2) to generate a formula for carry bit C2 yields Equation (8) as follows:

$$C2 = G1 + P1 \cdot G0 + P1 \cdot P0 \cdot C0 \quad (8)$$

Continuing this pattern, formulas can be generated for carry bits C3 and C4 according to Equations (9) and (10) as follows:

$$C3 = G2 + P2 \cdot G1 + P2 \cdot P1 \cdot G0 + P2 \cdot P1 P0 \cdot C0 \quad (9)$$

$$C4 = G3 + P3 \cdot G2 + P3 \cdot \cdot P2 \cdot G1 + P3 \cdot P2 \cdot P1 \cdot G0 + P3 \cdot P2 \cdot P1 \cdot P0 \cdot C0 \quad (10)$$

Since (as indicated by Equations (4) and (5)) the propagate and generate bits, Pi and Gi, depend only on the input bits, Ai and Bi, and since (as indicated by Equations (7)-(10)) carry bits C1-C4 depend only on the propagate and generate bits, P0-P3 and G0-G3, and carry bit C0, the processing in look-ahead carry adder 200 can be implemented in the following three steps, where the operations within each step are implemented in parallel.

In the first step, each 1-bit adder implements Equations (4) and (5) to generate its propagate and generate bits, Pi and Gi, and provides those values to look-ahead carry generation logic 205. In the second step, look-ahead carry generation logic 205 implements Equations (7)-(10) to generate carry bits C1-C4. In the third step, each 1-bit adder implements Equation (6) to generate its corresponding sum bit SUMi.

In this way, 4-bit look-ahead carry adder 200 of FIG. 2 can operate faster than 4-bit ripple-carry adder 100 of FIG. 1, albeit at the added cost of implementing look-ahead carry generation logic 205, whose complexity increases as the number of bits increases.

SUMMARY

In one embodiment, the present invention is circuitry adapted to selectively operate in a look-up table (LUT) mode or an arithmetic mode. The circuitry comprises a LUT circuit and a control circuit. The LUT circuit has a plurality of memory cells and a decoder connected to receive signals based on data stored in the memory cells and having a plurality of multiplexers (muxes) configured in one or more decoder stages. The control circuit is connected to the LUT circuit and controls whether the circuitry operates in the LUT mode or the arithmetic mode.

In another embodiment, the present invention is circuitry adapted to selectively operate in a LUT mode or an arithmetic mode. The circuitry comprises a LUT circuit, a control circuit, and carry-out circuitry. The LUT circuit has a plurality of memory cells and a decoder connected to receive signals based on data stored in the memory cells. The decoder has a plurality of muxes configured in at least three decoder stages. The control circuit is connected to the LUT circuit and controls whether the circuitry operates in the LUT mode or the arithmetic mode. The carry-out circuitry is connected to a third decoder stage of the LUT circuit and selects the value of a carry-out signal propagated by the LUT circuit if the circuitry is operating in the arithmetic mode.

In yet another embodiment, the present invention is a method for using a LUT circuit to implement an arithmetic function having a plurality of inputs and a plurality of outputs. The LUT circuit comprises a plurality of memory cells and a decoder connected to receive signals based on data stored in the memory cells. The decoder has a plurality of muxes configured in one or more decoder stages. Data corresponding to a first output of the arithmetic function is stored in a first subset of the memory cells, wherein each memory cell in the first subset stores data corresponds to the first output of the arithmetic function for a different set of input values. Data corresponding to a second output of the arithmetic function is stored in a second subset of the memory cells, wherein each memory cell in the second subset stores data corresponds to the first output of the arithmetic function for a different set of input values. Each set of input values for the first subset is identical to a corresponding set of input values for the second subset. A current set of input values is applied as control signals for a plurality of muxes in the decoder to retrieve a first output value from the first subset and a second output value from the second subset and present the first and second output values as outputs for the arithmetic function.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 3:
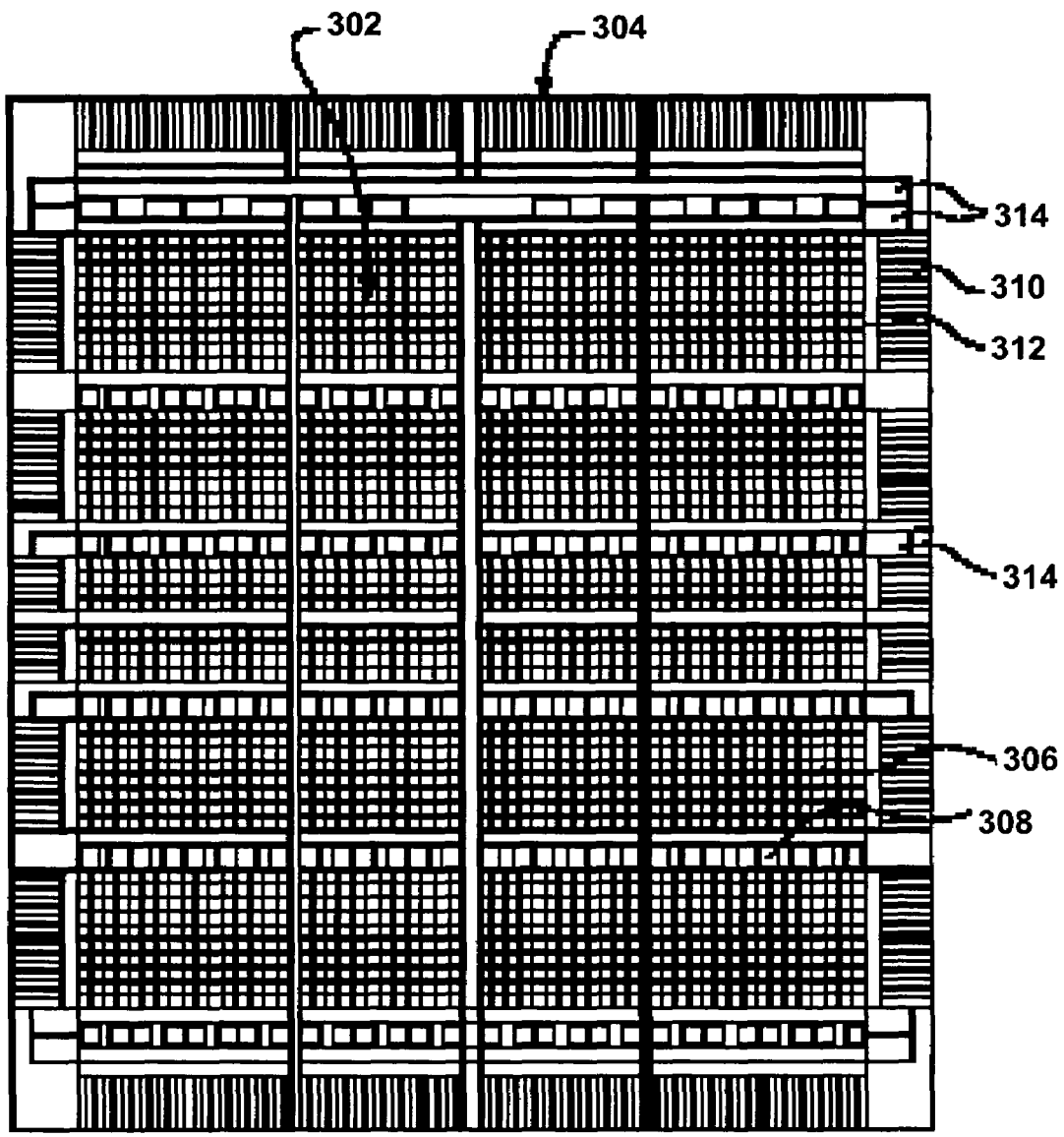
FIG. 3 shows a high-level block diagram of the layout of an exemplary field-programmable gate array (FPGA)

FIG. 3 shows a high-level block diagram of the layout of an exemplary field-programmable gate array (FPGA) 300 having a logic core 302 surrounded by an input/output (I/O) ring 304. Logic core 302 includes an array of programmable logic blocks (PLBs) 306 intersected by rows of block memory 308. Each PLB contains circuitry that can be programmed to perform a variety of different functions. The memory blocks in each row are available to store data to be input to the PLBs and/or data generated by the PLBs. I/O ring 304 includes sets of I/O buffers 310 programmably connected to the logic core by multiplexer/demultiplexer (mux/demux) circuits 312. The I/O buffers support external interfacing to FPGA 300. Also located within the I/O ring are a number of phase-locked loop (PLL) circuits 314 that are capable of providing different timing signals for use by the various elements within FPGA 300. Those skilled in the art will understand that FPGAs, such as FPGA 300, will typically include other elements, such as configuration memory, that are not shown in the high-level block diagram of FIG. 3. In addition, general routing resources, including clocks, buses, general-purpose routing, high-speed routing, etc. (also not shown in FIG. 3), are provided throughout the FPGA layout to programmably interconnect the various elements within FPGA 300.

The layout of FPGA 300 comprises multiple instances of a limited number of different types of blocks of circuitry. For example, I/O ring 304 contains a number of instances of the same basic block of programmable I/O circuitry repeated around the periphery of the device. Similarly, each PLB 306 within logic core 302 may be implemented using a different instance of the same set of programmable logic circuitry. Moreover, among other types of programmable logic circuitry, each PLB may include one or more instances of a particular type of programmable logic referred to as a LUT4 circuit.

Figure 4:
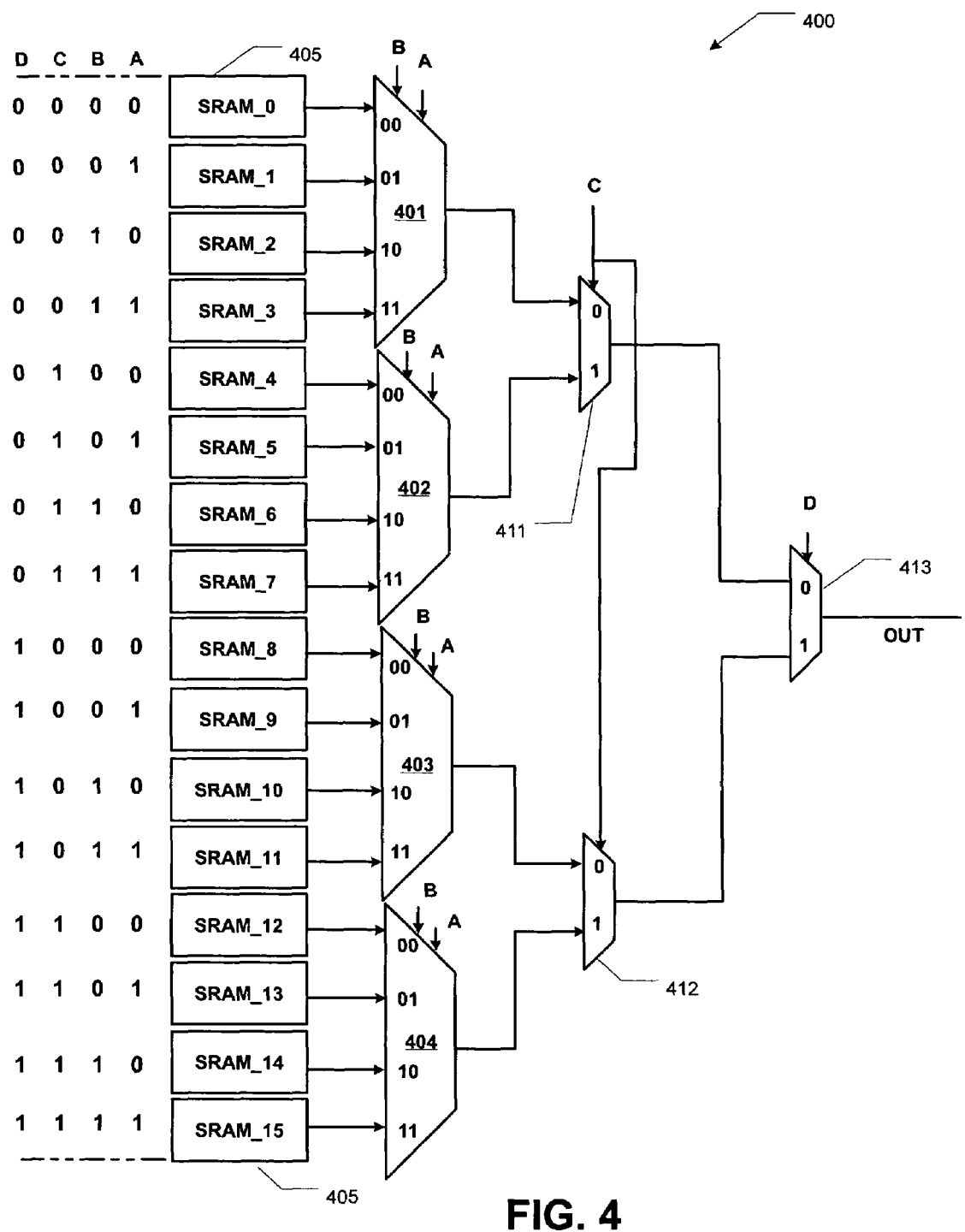
FIG. 4 shows a schematic block diagram of LUT4 circuit.

FIG. 4 shows a schematic block diagram of LUT4 circuit 400, one or more instances of which may be implemented in each PLB 306 of FIG. 3. As its name indicates, a LUT4 circuit may be used to implement a 4-input look-up table (LUT). As shown in FIG. 4, LUT4 circuit 400 comprises 16 one-bit SRAM (static random access memory) cells 405 and a decoder having seven multiplexers (muxes) arranged in three stages: a first stage with four (4×1) muxes 401-404, a second stage with two (2×1) muxes 411-412, and a third stage with a single (2×1) mux 413. Each of muxes 401-404 outputs one of its four inputs based upon the values of two one-bit control signals A and B. Each of muxes 411-412 outputs one of its two inputs based upon the value of one-bit control signal C, while mux 413 outputs one of its two inputs based upon the value of one-bit control signal D.

Although LUT4 circuit 400 has the three decoder stages shown in FIG. 4, in alternative embodiments, a LUT4 circuit could have a different decoder configuration. For example, a LUT4 circuit could have four stages: a first stage with eight (2×1) muxes controlled by control signal A, a second stage with four (2×1) muxes controlled by controlled signal B, a third stage with two (2×1) muxes controlled by controlled signal C, and a fourth stage with one (2×1) mux controlled by controlled signal D. As another example, a LUT4 circuit could have two stages: a first stage with four (4×1) muxes controlled by controlled signals A and B and a second stage with a single (4×1) mux controlled by controlled signals C and D.

If LUT4 circuit 400 is operated as a 4-bit LUT, then the four 1-bit control signals A, B, C, and D correspond to the 4-bit address (D C B A) of a particular one of the 16 SRAM cells 405, where D is the MSB and A is the LSB of the 4-bit address. As described in connection with FIGS. 5-8, LUT4 circuit 400 can also be used to implement different types of multi-bit carry adders.

Figure 2:
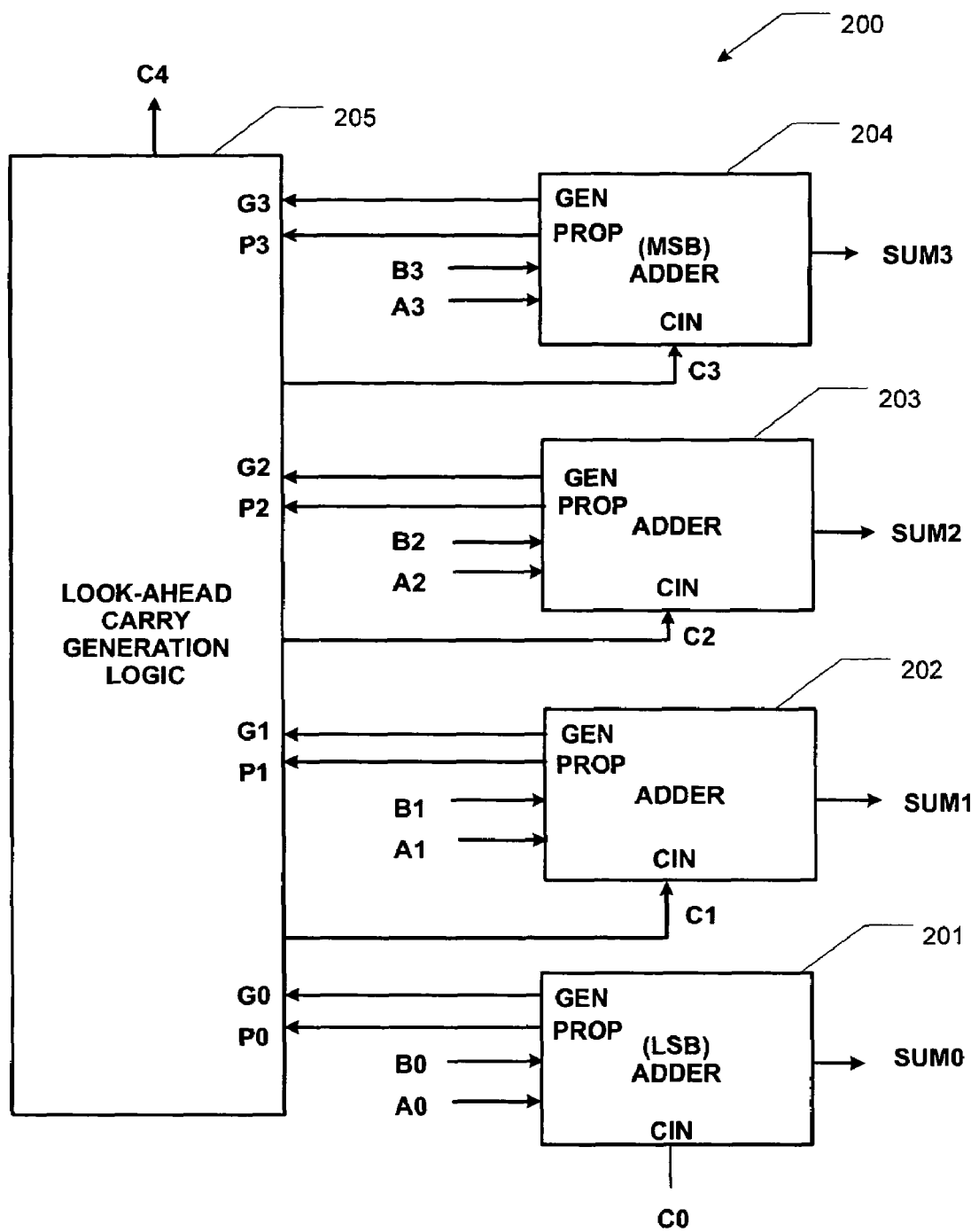
FIG. 2 shows a block diagram of conventional 4-bit look-ahead carry adder.
Figure 5:
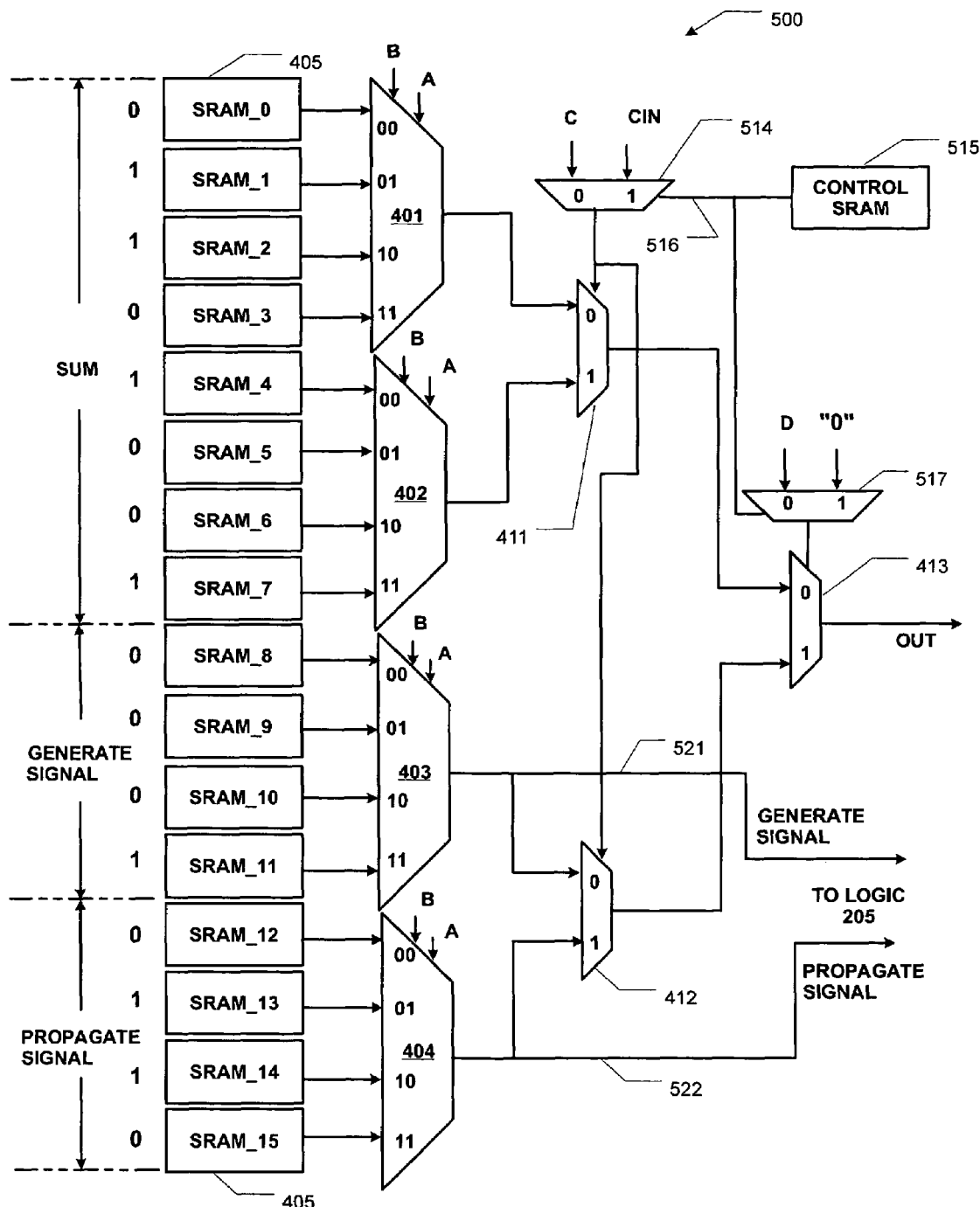
FIG. 5 shows a schematic block diagram of a first circuit based on the LUT4 circuit of FIG. 4 that can be used to implement a look-ahead carry adder having the same architecture as the multi-bit adder of FIG. 2, according to one embodiment of the present invention.

FIG. 5 shows a schematic block diagram of circuit 500, which is based on the LUT4 circuit of FIG. 4 and can be used to implement a look-ahead carry adder having the same architecture as the multi-bit adder of FIG. 2, according to one embodiment of the present invention. Circuit 500 includes SRAM cells 405 and muxes 401-404 and 411-413 of LUT4 circuit 400 of FIG. 4 plus muxes 514 and 517 and control SRAM cell 515.

Control SRAM cell 515 stores a 1-bit control signal 516 that determines whether circuit 500 operates in a LUT mode or an arithmetic mode. In particular, if control signal 516 has a value of 0, then circuit 500 operates in the LUT mode, where mux 514 selects 1-bit LUT control signal C, and mux 517 selects 1-bit LUT control signal D. In that case, muxes 411-413 can operate, in combination with muxes 401-404, in the normal 4-bit LUT mode, as previously described in connection with FIG. 4. Note that, in this 4-bit LUT mode, output signals 521 and 522 will typically be ignored.

On the other hand, if control signal 516 has a value of 1, then circuit 500 operates in the arithmetic mode, where different instances of circuit 500 may be used to implement the 1-bit adders of a look-ahead carry adder having the same architecture as 4-bit look-ahead carry adder 200 of FIG. 2. In that case, mux 514 selects carry-in bit CIN as the 1-bit control signal for each of muxes 411 and 412, and mux 517 selects the value "0" as the 1-bit control signal for mux 413, where circuit 500 can operate as the $i^{th}$ 1-bit adder in 4-bit look-ahead carry adder 200, such that:

Input control signals A and B correspond to input bits Ai and Bi of FIG. 2;

Input signal CIN corresponds to carry-in bit Ci of FIG. 2, received from look-ahead carry generation logic 205;

Output signal OUT corresponds to sum bit SUMi of FIG. 2; and

Output signals 521 and 522 correspond to the generate and propagate signals, Gi and Pi, respectively, of FIG. 2, provided to look-ahead carry generation logic 205.

In order to support the operations of a multi-bit look-ahead carry adder, SRAM cells are populated with the specific bit values shown in FIG. 5. In that case:

Memory cells SRAM_0 to SRAM_3 store the four values of SUMi for the four possible combinations of input bits Ai and Bi when carry-in bit Ci is 0, according to Equation (1);

Memory cells SRAM_4 to SRAM_7 store the four values of SUMi for the four possible combinations of input bits Ai and Bi when carry-in bit Ci is 1, according to Equation (1);

Memory cells SRAM_8 to SRAM_11 store the four values of generate bit Gi for the four possible combinations of input bits Ai and Bi, according to Equation (4); and Memory cells SRAM_12 to SRAM_15 store the four values of propagate bit Pi for the four possible combinations of input bits Ai and Bi, according to Equation (5).

The values stored in memory cells SRAM_0 through SRAM_7 are filled with the data bits shown in the following logic table corresponding to Equation (1):

| Ci | Bi | Ai | SUMi |
|----|----|----|------|
| 0  | 0  | 0  | 0    |
| 0  | 0  | 1  | 1    |
| 0  | 1  | 0  | 1    |
| 0  | 1  | 1  | 0    |
| 1  | 0  | 0  | 1    |
| 1  | 0  | 1  | 0    |
| 1  | 1  | 0  | 0    |
| 1  | 1  | 1  | 1    |

Figure 1:
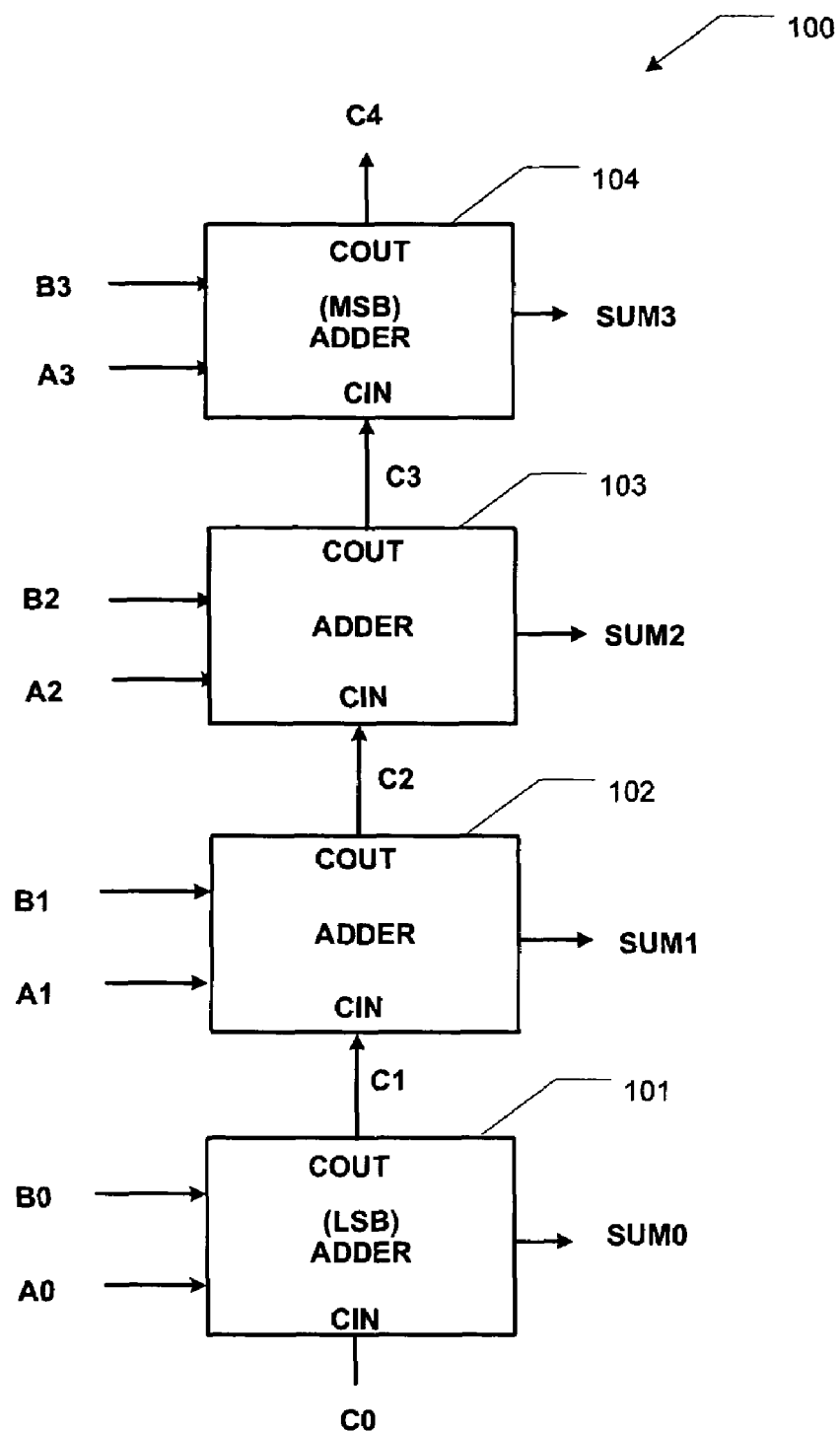
FIG. 1 shows a block diagram of conventional 4-bit ripple-carry adder.
Figure 6:
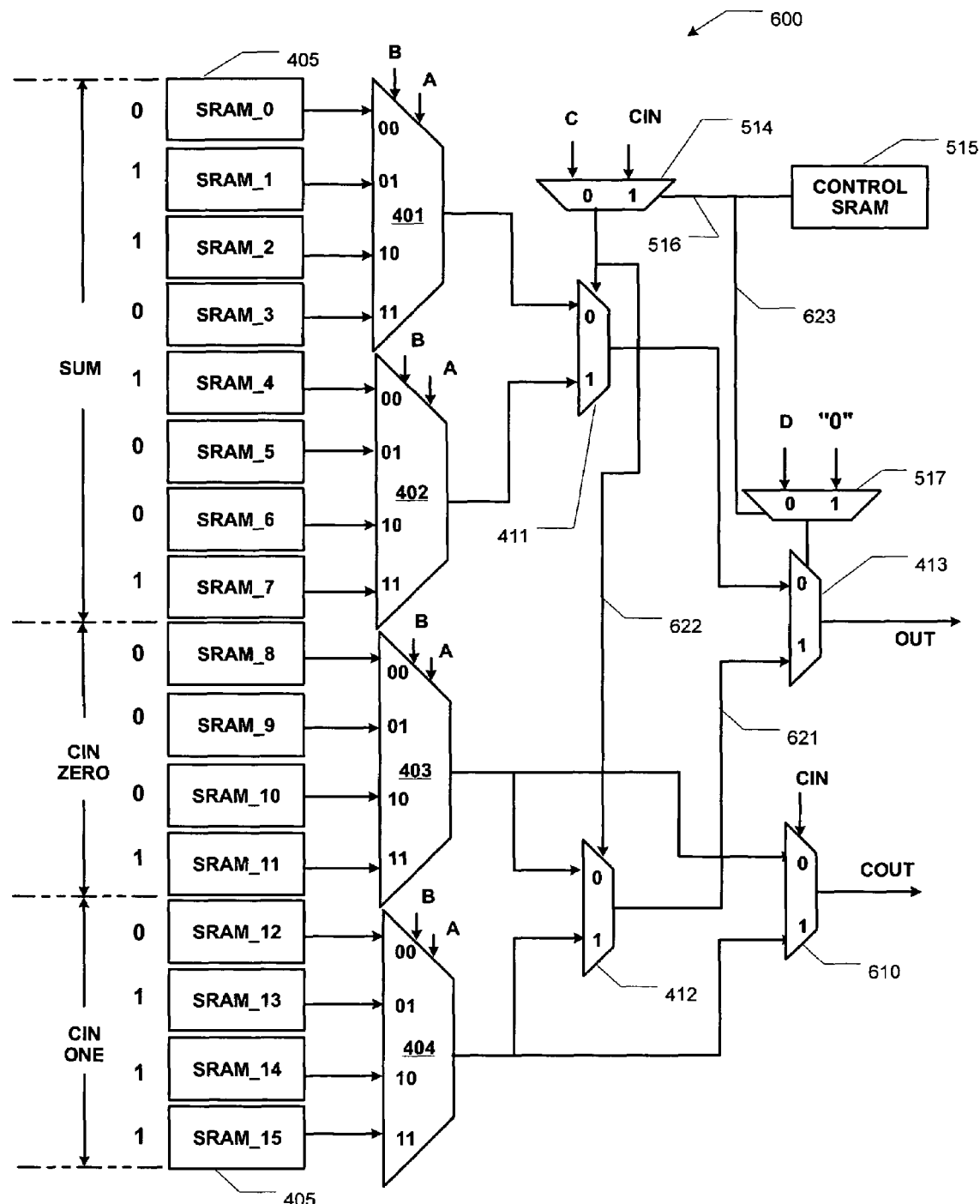
FIG. 6 shows a schematic block diagram of a second circuit based on the LUT4 circuit of FIG. 4 that can be used to implement a fast-carry adder having the same architecture as the multi-bit adder of FIG. 1, according to another embodiment of the present invention.

FIG. 6 shows a schematic block diagram of a circuit 600, which is based on the LUT4 circuit of FIG. 4 and can be used to implement a multi-bit fast-carry adder having the same architecture as 4-bit ripple-carry adder 100 of FIG. 1, according to another embodiment of the present invention. In particular, four instances of circuit 600 may be used to implement the four 1-bit adders 101-104 in 4-bit adder 100.

Circuit 600 has all of the same elements as circuit 500 of FIG. 5 with the addition of mux 610, to which carry-in bit CIN is applied as a control signal to generate carry-out bit COUT. Like circuit 500, circuit 600 can be configured to operate in either a LUT mode or an arithmetic mode by storing the appropriate value (i.e., 0 or 1, respectively) in control SRAM cell 515. In the LUT mode, output signal COUT from mux 610 will typically be ignored.

In the arithmetic mode, memory cells SRAM_0 to SRAM_7 and muxes 401-402, 411, and 413 operate identical to the corresponding elements in circuit 500 of FIG. 5 to generate sum bit SUMi as output signal OUT. Differences between circuits 500 and 600 lie in the use of memory cells SRAM_8 to SRAM_15 and muxes 403-404 and 412, and the presence of mux 610.

Equation (2) for the $(i+1)^{th}$ carry bit Ci+1 can be rewritten as Equation (11) as follows:

$$Ci+1 = Ai \cdot Bi + Ai \cdot Ci + Bi \cdot Ci \qquad (11)$$

According to one embodiment of the present invention, memory cells SRAM_8 to SRAM_11 are programmed with the results of Equation (11) for the four possible combinations of Ai and Bi assuming that carry-in bit ON is zero. In particular, if CIN is zero (i.e., Ci=0), then Equation (13) can be expressed as Equation (12) as follows:

$$Ci+1 = Ai \cdot Bi \qquad (12)$$

which corresponds to the following logic table, whose values are indicated in FIG. 6 for memory cells SRAM_8 to SRAM_11:

| Bi | Ai | Ci + 1 |
|----|----|--------|
| 0  | 0  | 0      |
| 0  | 1  | 0      |
| 1  | 1  | 0      |
| 1  | 1  | 1      |

Similarly, memory cells SRAM_12 to SRAM_15 are programmed with the results of Equation (12) for the four possible combinations of Ai and Bi assuming that carry-in bit CIN is one. In particular, if CIN is one (i.e., Ci=1), then Equation (13) can be expressed as Equation (13) as follows:

$$Ci+1 = Ai + Bi \qquad (13)$$

which corresponds to the following logic table, whose values are indicated in FIG. 6 for memory cells SRAM_12 to SRAM_15:

| Bi | Ai | Ci + 1 |
|----|----|--------|
| 0  | 0  | 0      |
| 0  | 1  | 1      |
| 1  | 1  | 1      |
| 1  | 1  | 1      |

In that case, mux 403 selects the value of carry-out bit Ci+1 for the current Ai and Bi values assuming a carry-in bit value of Ci=0, while mux 404 selects the value of carry-out bit Ci+1 for the current Ai and Bi values assuming a carry-in bit value of Ci=1. In addition to being applied to mux 412, the outputs from muxes 403 and 404 are also applied to mux 610, which uses the actual carry-in bit value CIN to select the appropriate carry-out bit value COUT.

When circuit 600 is operating in arithmetic mode, COUT is generated by mux 610 under the control of CIN. Signal 621, which corresponds to the output of mux 412 is generated under the control of signal 622. Signal 622 corresponds to the output of mux 514, which is controlled by signal 516. When circuit 600 is operating in arithmetic mode, signal 516 corresponds to a 1 resulting in mux 514 selecting CIN for output as signal 621. As such, muxes 412 and 610 are both controlled by CIN when circuit 600 is operating in arithmetic mode. Because the input signals to muxes 412 and 610 are identical, muxes 412 and 610 are logically equivalent structures when circuit 600 is operating in arithmetic mode. In an alternative embodiment, these two muxes may be implemented as a single mux without departing from the spirit and scope of the present invention.

Using circuit 600 of FIG. 6 to implement the 1-bit adders in a ripple-carry adder architecture like that shown in FIG. 1 provides a multi-bit adder having advantages over the prior art. In particular, by using the ripple-carry architecture of FIG. 1 instead of the look-ahead carry architecture of FIG. 2, a multi-bit adder of the present invention avoids the cost of implementing look-ahead carry generation logic like logic 205 of FIG. 2. Furthermore, by using a LUT4 circuit like that of FIG. 4 to pre-store and select pre-computed values, the multi-bit adder avoids the processing delays and circuit complexities of having to explicitly implement formulas similar to those of Equations (1) and (2), thereby providing a multi-bit adder that is faster than conventional ripple-carry adders.

Moreover, because circuit 600 is programmable, it can be used to implement functions other than 4-input look-up tables and multi-bit binary adders. For example, with a value of 0 stored in control SRAM 515, circuit 600 can be used to implement two different 3-input functions of A, B, and C, where the different results associated with the first function are stored in memory cells SRAM_0 to SRAM_7 and the different results associated with the second function are stored in memory cells SRAM_8 to SRAM_15, and control signal D determines whether the output signal OUT corresponds to the first function or the second function.

Circuit 600 can also be configured in arithmetic mode to implement multi-bit functions of A and B having carry bits other than multi-bit adders, such as multi-bit subtractors, counters, and comparators, where control SRAM 515 stores a value of one (to select the arithmetic mode), memory cells SRAM_0 to SRAM_3 store the output bit values for a carry-in bit value CIN=0, memory cells SRAM_4 to SRAM_7 store the output bit values for a carry-in bit value CIN=1, memory cells SRAM_8 to SRAM_11 store the carry-out bit values COUT for a carry-in bit value CIN=0, and memory cells SRAM_12 to SRAM_15 store the carry-out bit values COUT for a carry-in bit value CIN=1. As in the multi-bit adder of FIG. 6, the carry-out value COUT is applied to the CIN input of the next instance of circuit 600 for the multi-bit function.

Circuit 600 can also be programmed to implement four different functions of A and B, where control SRAM 515 stores a value of one, the different results for the first function are stored in memory cells SRAM_0 to SRAM_3, the different results for the second function are stored in memory cells SRAM_4 to SRAM_7, the different results for the third function are stored in memory cells SRAM_8 to SRAM_11, the different results for the fourth function are stored in memory cells SRAM_12 to SRAM_15, the value of CIN determines whether the first and third functions or the second and fourth functions are selected by muxes 411 and 610, respectively, where output signal OUT corresponds to the first and second functions, while output signal COUT corresponds to the third and fourth functions. Note that COUT may be applied to the CIN input of the next instance of circuit 600.

Figure 7:
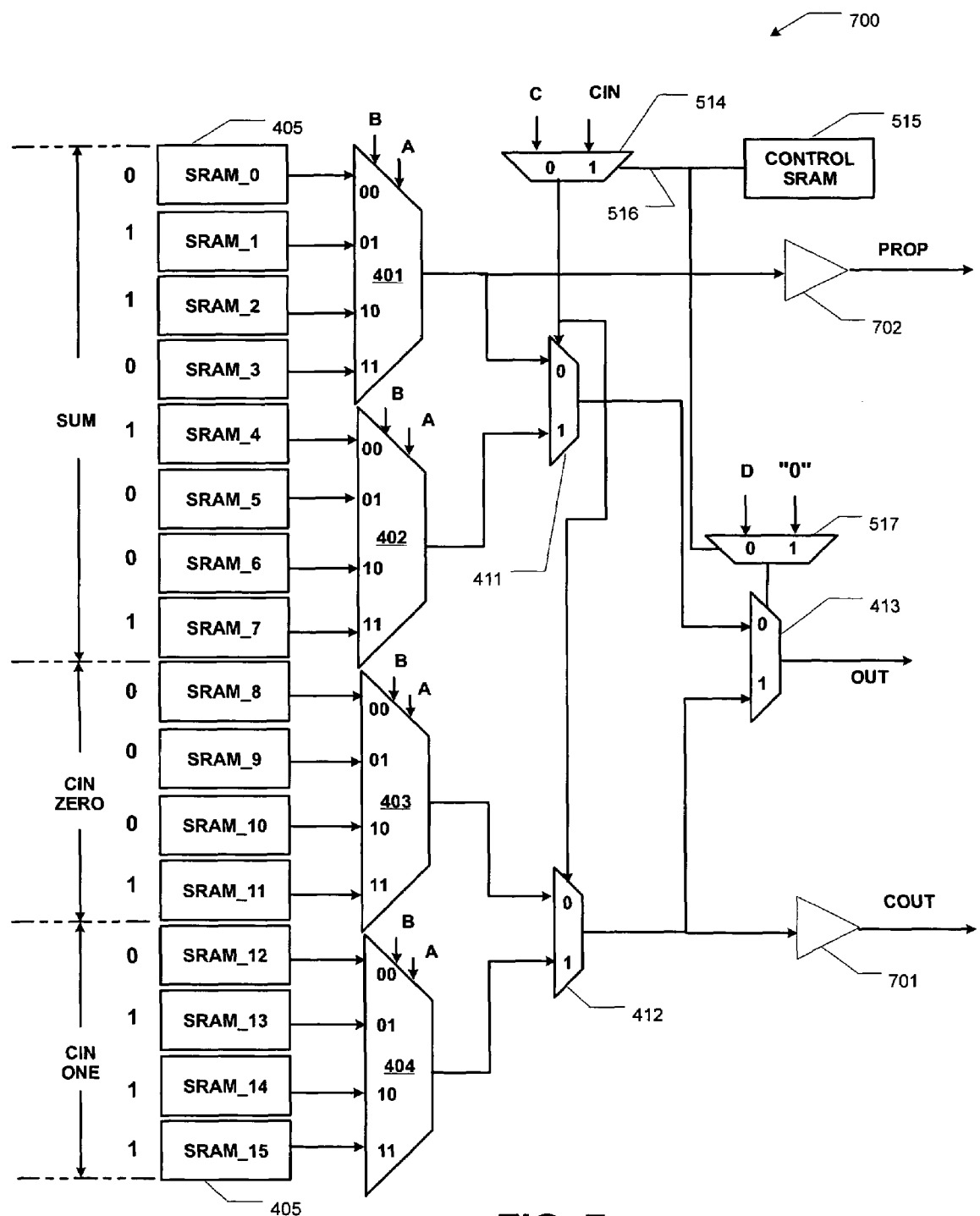
FIG. 7 shows a schematic block diagram of a third circuit based on the LUT4 circuit of FIG. 4 that can be used to implement another fast-carry adder having a similar architecture as the multi-bit adder of FIG. 2, according to yet another embodiment of the present invention.

FIG. 7 shows a schematic block diagram of a circuit 700, which is based on the LUT4 circuit of FIG. 4 and can be used to implement another fast-carry adder having a similar architecture as the multi-bit adder of FIG. 2, according to yet another embodiment of the present invention. As noted above, the multi-bit adder of FIG. 2 includes additional logic circuitry that attempts to speed up generation of carry-out signals from subsets of multiple single-bit adder stages within the multi-bit adder. For example, by using signals present within circuit 700, a simplified look-ahead carry generation circuit may be used to reduce carry-bit signal propagation times for a pair of LUT4-based single-bit adder stages.

Circuit 700 receives input signals A, B, C, CIN, and D, as discussed above with reference to FIGS. 4-6. Circuit 700 generates output signals OUT and COUT as discussed above with reference to FIG. 6. Buffer gate 701 receives and buffers the output of mux 412 to generate COUT signal, which is based upon the contents of SRAM_8 through SRAM_15 cells. The appropriate SRAM cell is selected using muxes 403-404 and 412, as discussed above with reference to FIG. 6.

Fast-carry generation signal PROP is defined as (A XOR B), as noted above in Equation (5). This particular function corresponds to the output of MUX 401, which selects its output based upon input signals A and B. The output of mux 401 corresponds to contents of the selected SRAM cell from memory cells SRAM_0 through SRAM_3. As noted above in reference to FIGS. 5-6, memory cells SRAM_0 through SRAM_3 contain the (A XOR B) function that is used in generating the single-bit sum value corresponding to the OUT signal. The PROP signal may therefore be generated by buffer gate 702, which receives and buffers the output of mux 401.

Figure 8:
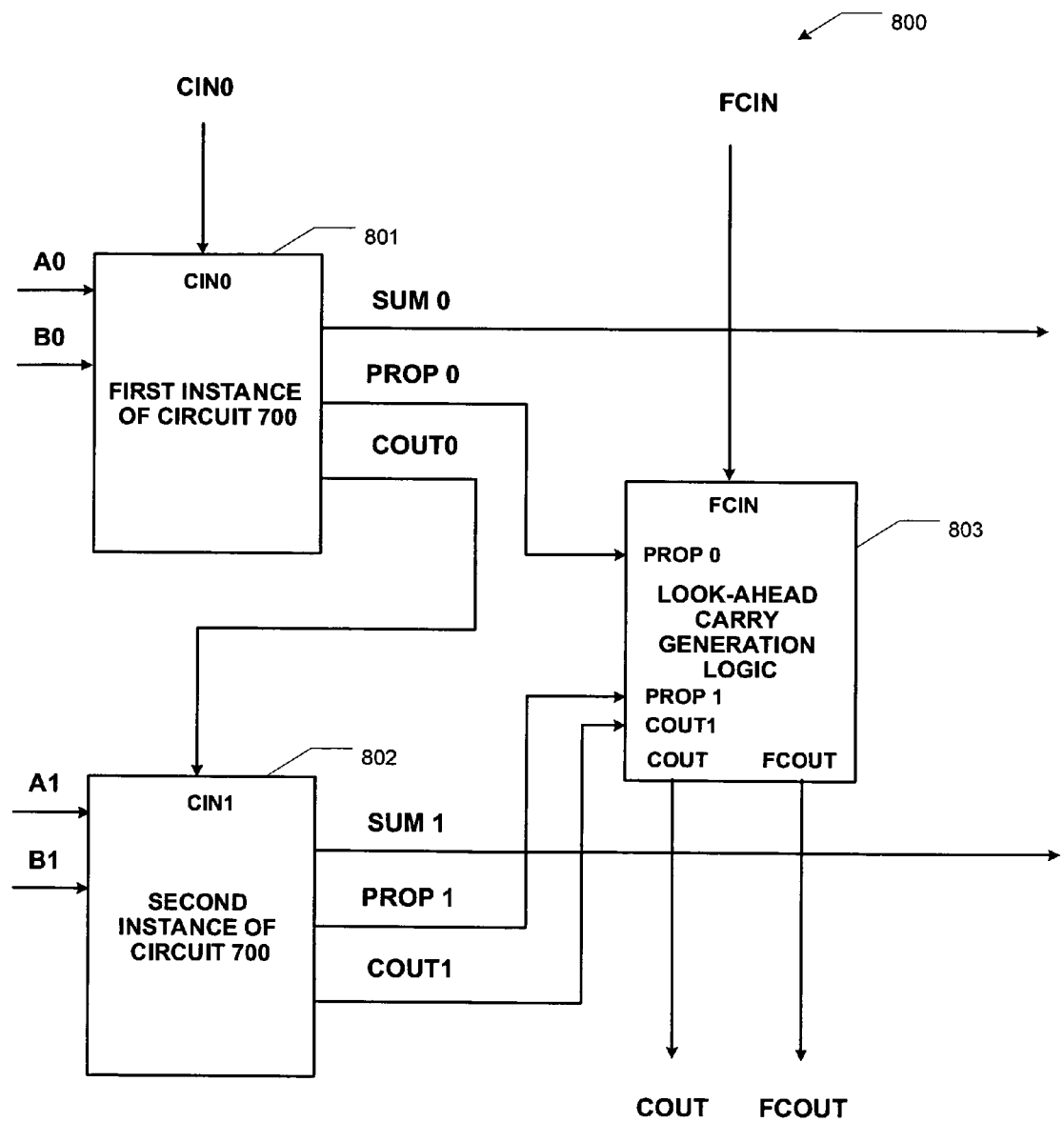
FIG. 8 shows a schematic block diagram for a multi-bit adder utilizing the LUT4-based circuit of FIG. 7.

FIG. 8 shows a schematic block diagram for a two-bit adder 800 constructed using two instances 801-802 of circuit 700 of FIG. 700 and look-ahead carry generation logic 803. First circuit 801 generates the LSB of the two-bit addition of (A1 A0) and (B1 B0). Input signals A0, B0, and CIN0 are used by first circuit 801 to generate output signals SUM0, PROP0, and COUT0. SUM0 signal is the output of adder 800 that corresponds to the LSB of the two-bit sum. PROP0 corresponds to the PROP signal generated within first circuit 801. PROP0 is transmitted to look-ahead carry generation logic 803 for use in generating a fast carry-out signal FCOUT. COUT0 corresponds to the carry-out signal from first circuit 801 that is transmitted to second circuit 802 for use as its corresponding CIN signal.

Second circuit 802 generates the second bit of the two-bit addition. Input signals A1, B1, and CIN1 are used by second circuit 802 to generate output signals SUM1, PROP1, and COUT1. SUM1 signal is the output of adder 800 that corresponds to the MSB of the two-bit sum. PROP1 corresponds to the PROP signal generated within second circuit 802. PROP1 and COUT1 are both transmitted to look-ahead carry generation logic 803 for use in generating fast carry-out signal FCOUT. Look-ahead carry generation logic 803 receives the above signals from first circuit 801 and second circuit 802 as well as fast-carry input signal FCIN, which is typically identical to CIN0. Look-ahead carry generation logic 803 uses these signals to generate output signals COUT and FCOUT, which may be used as CIN and FCIN, respectively, by a subsequent instance of two-bit adder 800 in a multi-bit adder.

Figure 9:
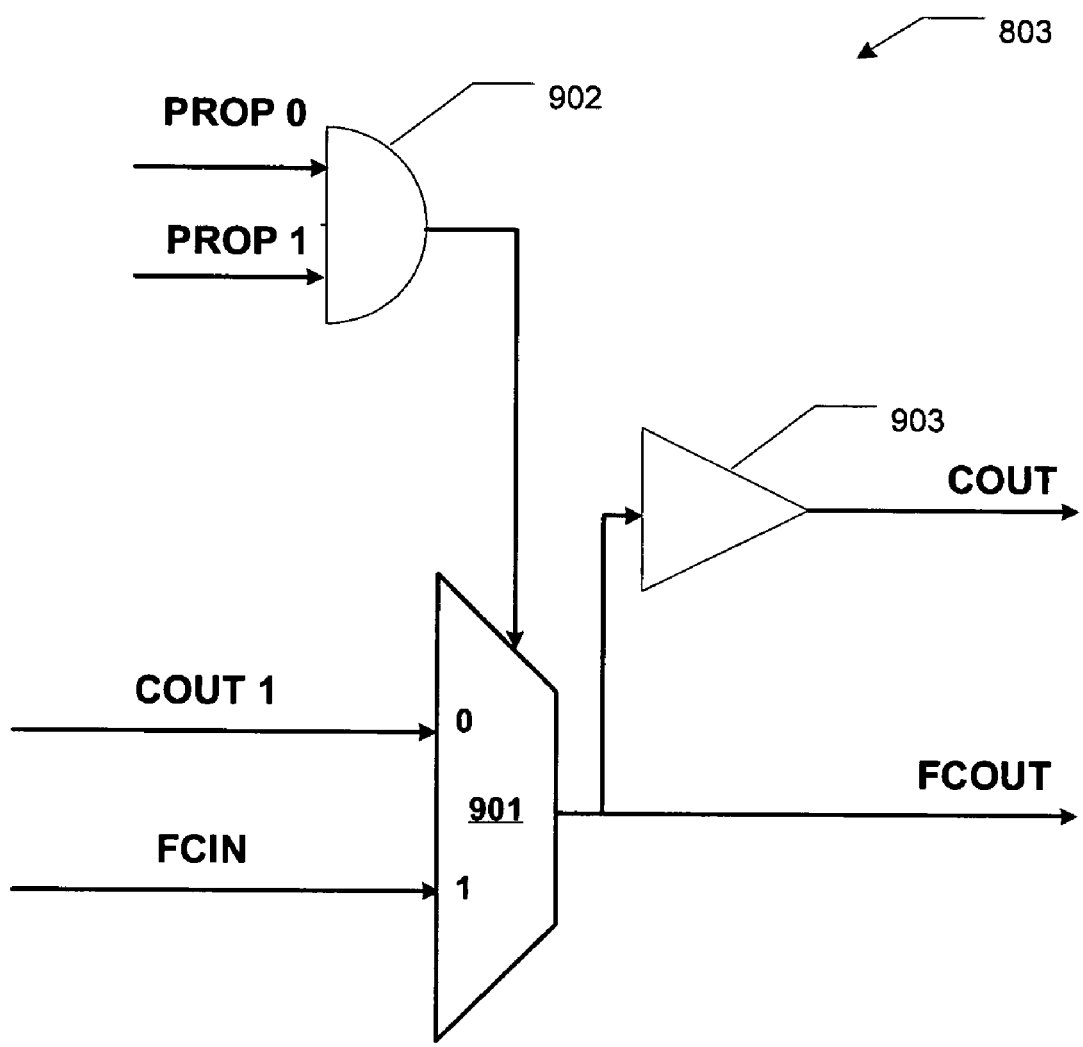
FIG. 9 shows a schematic block diagram for the look-ahead carry generation logic circuit of FIG. 8.

FIG. 9 shows a schematic block diagram for look-ahead carry generation circuit 803 of FIG. 8. Look-ahead carry generation circuit 803 comprises mux 901, AND gate 902, and buffer gate 903. From Equation (2) above, carry-out signal COUTi for the $i^{th}$ single-bit adder stage within a multi-bit adder is defined as:

$$COUTi = Ai \cdot Bi + (Ai\ XOR\ Bi) \cdot CINi \qquad (14)$$

where Ai and Bi correspond to the $i^{th}$ bits of the two numbers being added together and CINi corresponds to the carry-in bit to the $i^{th}$ stage of the multi-bit adder.

From equation (5), the $i^{th}$ PROP signal is defined as:

$$PROPi = (Ai\ XOR\ Bi) \qquad (15)$$

Substituting Equation (15) into Equation (14) yields the following relationships for the COUT and PROP signals of FIG. 8:

$$COUT0 = A0 \cdot B0 + PROP0 \cdot CIN0 \qquad (16)$$

$$COUT1 = A1 \cdot B1 + PROP1 \cdot CIN1 \qquad (17)$$

Because COUT0 is the same signal as CIN1, equation (17) may be rewritten as:

$$COUT1 = A1 \cdot B1 + PROP1 \cdot (A0 \cdot B0 + PROP0 \cdot CIN0) \qquad (18)$$

COUT1 may then be expanded as follows:

$$COUT1 = A1 \cdot B1 + PROP1 \cdot A0 \cdot B0 + PROP1 \cdot PROP0 \cdot CIN0 \qquad (19)$$

CIN0 corresponds to the FCIN signal to look-ahead carry generation logic 803. From Equation (19), if A0≈B0 and A1≈B1, then A0·B0=0, A1·B1=0, and, according to Equation (15), PROP0 and PROP1 are both 1, and Equation (19) reduces to COUT1=CIN0=FCIN.

As such, look-ahead carry generation logic 803 is useful in speeding up generation of the COUT signal when the PROP0 and PROP1 signals are both 1 since only when the PROP0 and PROP1 signals are both 1 does the COUT signal depend upon the arrival of the CIN0 signal from an earlier two-bit stage in a multi-bit adder in order to properly determine the correct value for the COUT signal. Otherwise, the COUT signal is the COUT1 signal generated by first and second circuits 801-802.

Look-ahead carry generation circuit 803 implements the above logic by controlling mux 901 with the output of AND gate 902. AND gate 902 asserts a logical 1 if both PROP1 and PROP0 signals are a 1. In that case, mux 901 selects the FCIN signal for both FCOUT and COUT (via buffer gate 903). If AND gate 902 asserts a logical 0, then mux 901 selects COUT1 from circuit 802.

As noted above, input signals CIN0 and FCIN are logically the same signal. These input signals correspond to the carry-in input signal to first circuit 801. Output signals COUT and FCOUT are also logically the same signal. These two output signals correspond to the carry-out signal from second circuit 802. In the embodiment disclosed within FIGS. 8 and 9, there are two logically identical input signals (CIN0 and FCIN) and two logically identical output signals (COUT and FCOUT). These are utilized to isolate the fast-carry signals FCIN and FCOUT (which correspond to look-ahead carry generation logic 803) from the carry-in and carry-out signals CIN0 and COUT1 (which correspond to first and second circuits 801-802). The isolation of these signal paths may reduce signal propagation delays that are typically caused by parasitic capacitance that arises from input loading of these signals. Separating the input carry-in signal into CIN0 and FCIN signals permits various instances of the input-carry signal to operate more quickly. Similarly, by separating the output-carry signal into COUT and FCOUT signals permits the various instances of the output-carry signal to also operate more quickly. Because look-ahead carry logic is used to speed up carry signal propagation, separating the input and output carry signals as disclosed in FIGS. 8 and 9 assists in the speed increase for these signals. One skilled in the art will recognize that use of a single carry-in signal and use of a single carry-out signal is possible without deviating from the spirit and scope of the present invention.

The present invention has been described in the context of circuitry based on a LUT4 circuit. Those skilled in the art will understand that the present invention can also be implemented in the context of circuitry based on other types of LUT circuits, such as a LUT5 circuit having 32 memory cells and 5 input signals. Such LUT circuits can be used to implement analogous functions such as multi-bit adders and the like, where only a portion of the LUT circuit is used. Alternatively, larger LUT circuits can be used to implement even faster functions. For example, larger LUT circuits could be used to implement a multi-bit adder, where each stage in the multi-bit adder adds two 2-bit (or larger) values.

In comparison to the look-ahead carry adder based on circuit 500 of FIG. 5, an estimated area savings of around 80% for a multi-bit adder based on circuit 600 of FIG. 6 may be obtained at a cost of an additional mux delay per slice of the adder.

Although the present invention has been described in the context of LUT circuits having SRAM memory cells, those skilled in the art will understand that the present invention can be implemented using other types of memory cells.

Depending on the particular implementation, a circuit of any of FIGS. 5-7 may represent a set of hardwired circuitry, e.g., instantiated one or more times in a programmable device, such as an FPGA. Alternatively, such a circuit could be programmably configured in such a programmable device using the general routing resources and other programmable features of such a device. For example, the circuit could be configured in a programmable device having a LUT4 circuit, such as LUT4 circuit 400 of FIG. 4, and miscellaneous muxes and SRAM cells that can be programmably interconnected using the general routing resources of the programmable device.

Although the present invention has been described in the context of FPGAs, those skilled in the art will understand that the present invention can be implemented in the context of other types of programmable devices, such as, without limitation, programmable logic devices (PLDs), mask-programmable gate arrays (MPGAs), simple programmable logic device (SPLDs), and complex programmable logic devices (CPLDs). More generally, the present invention can be implemented in the context of any kind of electronic device having programmable elements.

In general, the present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. Circuitry adapted to selectively operate in a look-up table (LUT) mode or an arithmetic mode, the circuitry comprising:
a LUT circuit having a plurality of memory cells and a decoder connected to receive signals based on data stored in the memory cells and having a plurality of multiplexers (muxes) controlled by LUT address signals A, B, C, and D and configured in three decoder stages, the first stage having four muxes controlled by address signals A and B in either mode, the second stage having two muxes controlled by address signal C in the LUT mode, and the third stage having one mux controlled by address signal D in the LUT mode; and
a control circuit connected to the LUT circuit and adapted to control whether the circuitry operates in the LUT mode as a LUT or the arithmetic mode as an adder, wherein the control circuit includes:
a memory cell adapted to store a control signal for the control circuit;
a first mux connected to receive the control signal at its selection input, address signal C at one signal input, and a carry-in signal CIN at another signal input, and having an output connected to the selection inputs of the two multiplexers in the second decoder stage; and
a second mux connected to receive the control signal at its selection input, address signal D at one signal input, and a constant value signal at another signal input, and having an output connected to the selection input of the multiplexer in the third decoder stage,
wherein in the arithmetic mode, the two muxes of the second decoder stage are controlled by carry-in signal CIN and the one mux of the third decoder stage is controlled by the constant value signal such that the sum of address signals A and B and carry-in signal CIN appears at the output of the one mux of the third decoder stage.

2. The invention of claim 1, further comprising carry-out circuitry connected to the LUT circuit, the carry-out circuitry including a third mux having its signal inputs connected to two muxes of the first decoder stage and its selection input connected to receive the carry-in signal CIN.

3. The invention of claim 1, wherein the circuitry is implemented as part of an FPGA.

4. The invention of claim 3, wherein the FPGA comprises a plurality of programmable logic blocks (PLBs), at least one PLB having one or more instances of the circuitry.

* * * * *